(12) United States Patent
Menet

(10) Patent No.: US 10,133,254 B2
(45) Date of Patent: Nov. 20, 2018

(54) SYSTEM AND METHOD FOR CONTROLLING A VALVE

(71) Applicant: FISHER CONTROLS INTERNATIONAL LLC, Marshalltown, IA (US)

(72) Inventor: Nicolas Menet, Chelles (FR)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 441 days.

(21) Appl. No.: 14/677,037

(22) Filed: Apr. 2, 2015

(65) Prior Publication Data

US 2015/0286205 A1 Oct. 8, 2015

Related U.S. Application Data

(60) Provisional application No. 61/975,085, filed on Apr. 4, 2014.

(51) Int. Cl.
*G05B 19/19* (2006.01)
*G05B 19/042* (2006.01)
(Continued)

(52) U.S. Cl.
CPC ............ *G05B 19/19* (2013.01); *F15B 19/005* (2013.01); *F15B 20/00* (2013.01); *F15B 21/087* (2013.01);
(Continued)

(58) Field of Classification Search
CPC ..... G05B 19/19; G05B 19/042; F15B 19/005; F15B 20/00; F15B 21/087; F15B 21/085;
(Continued)

(56) References Cited

U.S. PATENT DOCUMENTS 5,206,810 A * 4/1993 Bools ................. G05B 9/03
318/564
5,669,353 A * 9/1997 Shirai ................. F02D 11/107
123/399

(Continued)

FOREIGN PATENT DOCUMENTS

CA 2727208 A1 7/2012

OTHER PUBLICATIONS

International Preliminary Report on Patentability and Written Opinion for corresponding International application No. PCT/US2015/024191, dated Oct. 4, 2016.

(Continued)

*Primary Examiner* — Christopher E. Everett
(74) *Attorney, Agent, or Firm* — Marshall, Gerstein & Borun LLP

(57) ABSTRACT

A system and method for controlling a valve increases the availability of a control valve assembly used in a control process. A pair of positioners are arranged in a high-availability configuration and individually coupled to a controller. A first positioner includes an output coupled to a switch and a second positioner includes an output coupled to the switch. The operating state of the first positioner is monitored and the output of the first or second positioner allowed to pass through the switch to the control valve is dependent upon the operating status of the first positioner.

13 Claims, 3 Drawing Sheets

(51) Int. Cl.
  *F16K 37/00* (2006.01)
  *F15B 19/00* (2006.01)
  *F15B 20/00* (2006.01)
  *F15B 21/08* (2006.01)
  *F15B 5/00* (2006.01)

(52) U.S. Cl.
  CPC ...... *F16K 37/0075* (2013.01); *F16K 37/0083* (2013.01); *G05B 19/042* (2013.01); *F15B 5/006* (2013.01); *F15B 21/085* (2013.01); *F15B 2211/8626* (2013.01); *F15B 2211/8636* (2013.01); *F15B 2211/87* (2013.01); *F15B 2211/8757* (2013.01); *G05B 2219/25312* (2013.01); *G05B 2219/45006* (2013.01)

(58) Field of Classification Search
  CPC .............. F15B 2211/8757; F15B 5/006; F15B 2211/8626; F15B 2211/8636; F15B 2211/87; F16K 37/0083; F16K 37/0075
  USPC ....................................................... 700/282
  See application file for complete search history.

(56) References Cited

U.S. PATENT DOCUMENTS

| | | | |
|---|---|---|---|
| 2004/0250861 | A1 | 12/2004 | Schnell et al. |
| 2006/0266966 | A1* | 11/2006 | Karte ................ F16K 37/0083 251/129.04 |
| 2012/0175536 | A1* | 7/2012 | Hanson ............... F16K 37/0083 251/129.01 |
| 2015/0013786 | A1* | 1/2015 | Esposito ............... F15B 15/202 137/487.5 |

OTHER PUBLICATIONS

International Search Report and Written Opinion for corresponding International application No. PCT/US2015/024191, dated Jul. 30, 2015.

\* cited by examiner

SYSTEM AND METHOD FOR CONTROLLING A VALVE

RELATED PATENT APPLICATIONS

This patent application claims the filing benefit of U.S. Provisional Patent Application No. 61/975,085, filed Apr. 4, 2014; the contents of which are herein incorporated by reference.

FIELD OF THE DISCLOSURE

The present disclosure is directed to process control systems, and more particularly, to controlling a valve.

BACKGROUND

Process control systems, such as distributed or scalable process control systems like those used in chemical, petroleum or other processes, typically include one or more process controllers communicatively coupled to at least one host or user workstation and to one or more field devices via analog, digital, or combined analog/digital buses. The field devices, which may include, for example, control valves, valve positioners, switches, and transmitters (for example, temperature, pressure, and flow rate sensors), perform functions within the process such as opening or closing valves and measuring process parameters. The process controller receives signals indicative of process measurements made by the field devices and/or other information pertaining to the field devices, and uses this information to implement a control routine to generate control signals, which are sent over the buses to the field devices to control the operation of the process. Information from each of the field devices and the controller is typically made available to one or more applications executed by the user workstation to enable an operator to perform any desired function regarding the process, such as viewing the current state of the process and/or modifying the operation of the process. In the event that a field device fails, the operational state of the entire process control system can be jeopardized.

SUMMARY

One embodiment of the present invention is directed to a system for controlling a field device, for example, a valve, in a control process. The system includes a first positioner having an operating state and configured to receive a first control signal at a first input of the first positioner, wherein the first positioner provides a first output signal at a first output of the first positioner in response to the first control signal. The system further includes a second positioner configured to receive a second control signal at a first input of the second positioner, wherein the second positioner provides a second output signal at a first output of the second positioner in response to the second control signal. The system further includes a switch including a first input coupled to the first output of the first positioner and receiving the first output signal, a second input coupled to the first output of the second positioner and receiving the second output signal, and a third input responsive to the operating state of the first positioner. The switch further includes an output coupled to the field device, wherein the switch permits the first output signal of the first positioner to pass to the field device when the operating state of the first positioner is operable and the switch permits the second output signal of the second positioner to pass to the field device when the operating state of the first positioner is inoperable.

Another embodiment of the invention is directed to method of controlling a field device in a control process. The method includes receiving a control signal at a first positioner and a second positioner; generating a first output signal from the first positioner in response to the control signal; generating a second output signal from the second positioner in response to the control signal; monitoring operation of the first positioner; determining whether the first positioner is operational; automatically enabling the first output signal to reach the field device if the first positioner is operational; and automatically enabling the second output signal to reach the field device if the first positioner is not operational.

A further embodiment of the invention is directed to a method of controlling a field device in a control process. The method includes monitoring an operating state of the field device; receiving a first control signal at a first positioner; receiving a second control signal at a second positioner; generating a first output signal from the first positioner in response to the first control signal; generating a second output signal from the second positioner in response to the second control signal; enabling the first output signal to reach the field device; monitoring an operating state of the first positioner; detecting a failure associated with the operating state of the first positioner; automatically disabling the first output signal to reach the field device and enabling the second output signal to reach the field device.

Another further embodiment of the present invention is directed to tangible, computer-readable medium storing instructions that when executed by one or more processors of a computer system cause the computer system to: receive a control signal at a first positioner and a second positioner; generate a first output signal from the first positioner in response to the control signal; generate a second output signal from the second positioner in response to the control signal; monitor operation of the first positioner; determine whether the first positioner is operational; automatically enable the first output signal to reach the field device if the first positioner is operational; and automatically enable the second output signal to reach the field device if the first positioner is not operational.

A still further embodiment of the present invention is directed to tangible, computer-readable medium storing instructions that when executed by one or more processors of a computer system cause the computer system to: monitor an operating state of the field device; receive a first control signal at a first positioner; receive a second control signal at a second positioner; generate a first output signal from the first positioner in response to the first control signal; generate a second output signal from the second positioner in response to the second control signal; enable the first output signal to reach the field device; monitor an operating state of the first positioner; detect a failure associated with the operating state of the first positioner; automatically disable the first output signal to reach the field device and enable the second output signal to reach the field device.

DETAILED DESCRIPTION

Figure 1:
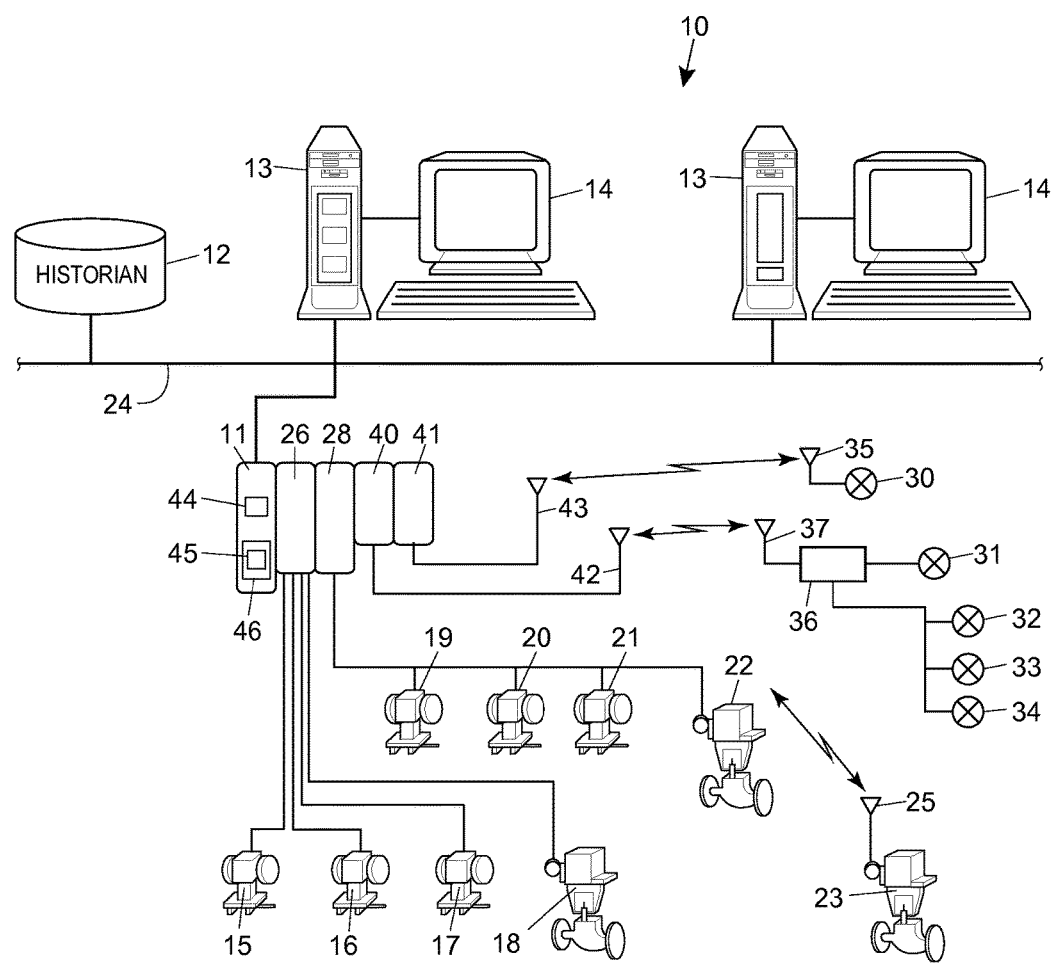
FIG. 1 is a schematic representation of an example process control system having one or more field devices constructed in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, 23 in communication with a process controller 11. The process controller 11 is communicably coupled to a data historian 12 and one or more user workstations 13. Each workstation 13 includes a user interface 14 to facilitate communication with the process control system 10. The user interface 14 may include one or more devices, such as a display screen, touch-screen, keyboard, and a mouse, for example. So configured, the controller 11 delivers signals to and receives signals from the field devices 15, 16, 17, 18, 19, 20, 21, 22, 23 and the workstations 13 to control the process control system.

In additional detail, the process controller 11 of the process control system 10 of the version depicted in FIG. 1 is connected via hardwired communication connections to field devices 15, 16, 17, 18, 19, 20, 21, 22 via input/output (I/O) cards 26 and 28. The data historian 12 may be any desired type of data collection unit having any desired type of memory and any desired or known software, hardware, or firmware for storing data. Moreover, while the data historian 12 is illustrated as a separate device in FIG. 1, it may instead or in addition be part of one of the workstations 13 or another computing device, such as a server. The controller 11, which may be, by way of example, a DeltaV™ controller sold by Emerson Process Management, is communicatively connected to the workstations 13 and to the data historian 12 via a communication network 24 that may be, for example, an internet or Ethernet connection.

The field devices 15, 16, 17, 18, 19, 20, 21, 22 are illustrated as being communicatively connected to the controller 11 via a hardwired communication scheme, which may include the use of any desired hardware, software, and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, 22 may be any types of devices, such as sensors, control valve assemblies, transmitters, positioners, for example, while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices that communicate over a digital bus to the I/O card 28 using Fieldbus protocol communications. Of course, the field devices 15, 16, 17, 18, 19, 20, 21, 22 may conform to any other desired standard(s) or protocols, including any standards or protocols developed in the future.

The process control system 10 depicted in FIG. 1 also includes a number of wireless field devices 23, 30, 31, 32, 33, 34 disposed in the plant to be monitored and/or controlled. The field device 23 is depicted as a control valve assembly including, for example, a control valve, while the field devices 30, 31, 32, 33, 34 are depicted as transmitters, for example, process variable sensors. Wireless communications may be established between the controller 11 and the field devices 23, 30, 31, 32, 33, 34 using any desired wireless communication equipment, including hardware, software, firmware, or any combination thereof now known or later developed. In the version illustrated in FIG. 1, an antenna 25 is coupled to the control valve assembly 23 to perform wireless communications for the control valve assembly 23. Likewise, an antenna 35 is coupled to and is dedicated to facilitate wireless communications for the transmitter 30, while a wireless router or other module 36 having an antenna 37 is coupled to collectively coordinate wireless communications for the transmitters 31, 32, 33, 34. The field devices or associated hardware 23, 30, 31, 32, 33, 34, 36 may implement protocol stack operations used by an appropriate wireless communication protocol to receive, decode, route, encode, and send wireless signals via the antennas 25, 35, 37 to implement wireless communications between the process controller 11 and the control valve assembly 23 and the transmitters 30, 31, 32, 33, 34.

If desired, the control valve assembly 23 may provide measurements made by sensors within the control valve assembly 23 or may provide other data generated by or computed by the control valve assembly 23 to the controller 11 as part of its operation. Of course, as is known, the control valve assembly 23 may also receive control signals from the controller 11 to effect physical parameters, for example, flow, within the overall process. Additionally, the transmitters 30, 31, 32, 33, 34 may constitute the sole link between various process sensors (transmitters) and the process controller 11 and, as such, are relied upon to send accurate signals to the controller 11 to ensure that process performance is not compromised. The transmitters 30, 31, 32, 33, 34 are often referred to as process variable transmitters (PVTs) and may play a significant role in the control of the overall control process.

The process controller 11 is operatively coupled to one or more I/O devices 40, 41, each connected to a respective antenna 42, 43, and the I/O devices and antennas operate as transmitters/receivers to perform wireless communications with the wireless field devices 23, 30, 31, 32, 33, 34 via one or more wireless communication networks. The wireless communications with the field devices 23, 30, 31, 32, 33, 34 may be performed using one or more known wireless communication protocols, such as the WirelessHART® protocol, the Ember protocol, a WiFi protocol, an IEEE wireless standard, etc. Still further, the I/O devices 40, 41 may implement protocol stack operations used by these communication protocols to receive, decode, route, encode, and send wireless signals via the antennas 42, 43 to implement wireless communications between the controller 11 and the control valve assembly 23 and the transmitters 30, 31, 32, 33, 34.

As illustrated in FIG. 1, the controller 11 conventionally includes a processor 44 that implements or oversees one or more process control and/or diagnostic routines 45 (or any module, block, or sub-routine thereof) stored in a memory 46. The process control and/or diagnostic routines 45 stored in the memory 46 may include or be associated with control loops being implemented within the process plant. Generally speaking, and as is generally known, the process controller 11 executes one or more control routines 45 and communicates with the field devices 15, 16, 17, 18, 19, 20, 21, 22, 23, 30, 31, 32, 33, 34, the user workstations 13, and the data historian 12 to control a process in any desired manner.

Several factors can affect the performance of the field devices used in the control system. For a control valve, for example, a severe operating environment and/or an extended maintenance cycle may adversely affect the performance of one or more valve components, which may ultimately affect the valve's availability to the control system. For instance, the positioner of a valve operating in a harsh and inhospitable location may stick, slip, drift, etc., due to extreme weather conditions. A poor performing valve is not available to be used in the control process.

Figure 2:
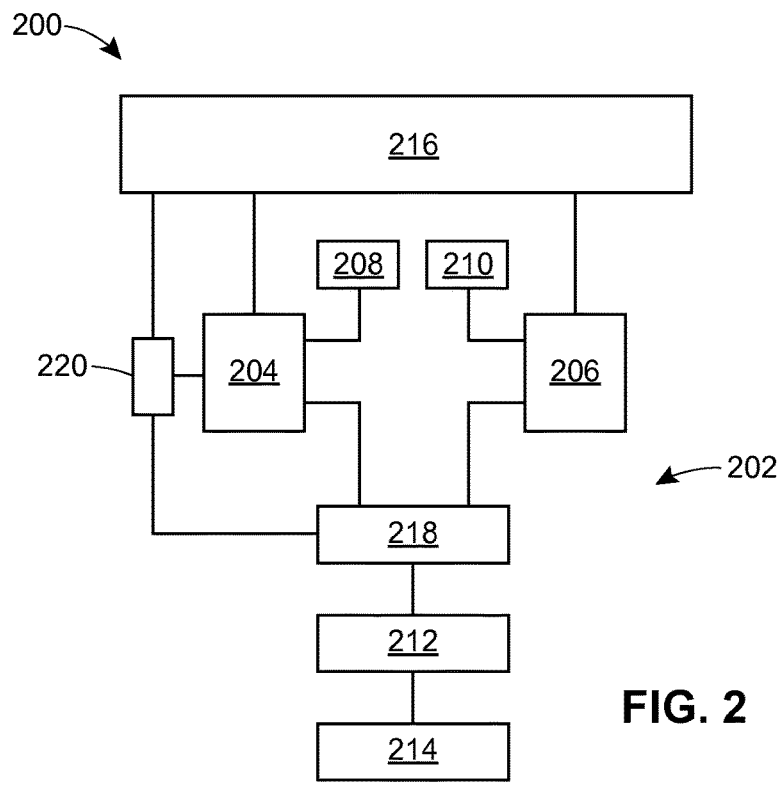
FIG. 2 is a schematic representation of an example control valve assembly constructed in accordance with the principles of the present disclosure.
Figure 3:
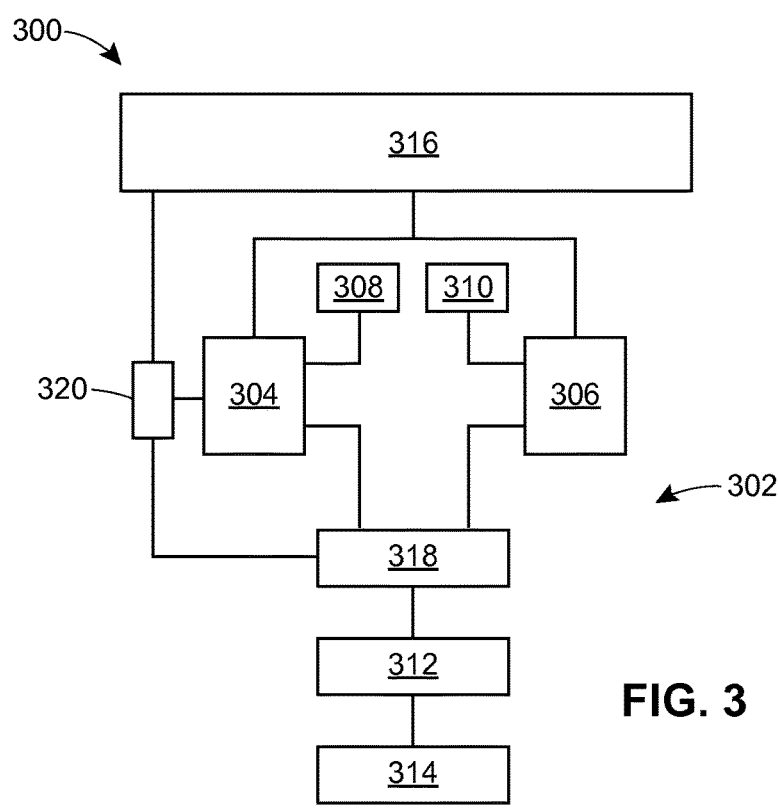
FIG. 3 is a schematic representation of another example control valve assembly constructed in accordance with the principles of the present disclosure.

One embodiment of the present invention shown in FIG. 2 is directed to increasing the availability of a control valve assembly 202 used in a control system 200. A pair of positioners 204, 206 are arranged in a high-availability configuration and individually coupled to a controller 216 and a processor (not shown). Each positioner 204, 206 includes an input coupled to a signal source (208, 210; respectively) for controlling a valve 214. Each positioner 204, 206 may be individually coupled to a separate signal source as shown in FIG. 2, or both positioners 204, 206 may be coupled to the same signal source as shown in FIG. 3. Depending upon the type of controller, the signal source 204, 206 utilized by the control valve assembly 202 may be pneumatic, hydraulic, or electrical based. In this example embodiment, the signal source for controlling the control valve 214 is pneumatic-based and the input of each positioner 204, 206 are coupled to a separate source of air-pressure.

Control signals sent from the controller 216 for controlling the valve 214 are received at each positioner 204, 206 and separately transformed as a respective output signal capable of cooperating with an actuator 212 for positioning the valve 214. Each positioner 204, 206 include an output coupled to a separate input of a switch 218. The switch 218 may be a multi-positioned (e.g., three) solenoid switch. An output of the switch 218 is coupled to an input of the actuator 212 that is coupled to the controller 214.

The pair of positioners 204, 206 and the switch 218 are configured in a manner where one of the positioners, e.g., a primary positioner, is implemented as the default positioner and primarily used by the controller 216 to position the valve 214. The other positioner, e.g., secondary positioner, supports or backs up the primary positioner, wherein the secondary positioner will be used to position the valve 214 should the primary positioner 204 be regarded as inoperable to some extent.

More particularly, the control system 200 monitors the operation of the first positioner 204, wherein the switch 218, in cooperation with a sensor 220, is adapted and configured to enable one of the outputs of the positioners 204, 206 to pass through to the actuator 212 depending on the operability of the first positioner 204. In general, if the first positioner 204 is operating properly, the switch 218 is positioned to permit the output signal received from the first positioner 204 to pass through to the actuator 212 and position the control valve 214 accordingly. On the other hand, if the first positioner 204 is not operating properly to some extent, the switch is positioned to permit the output signal received from the second positioner 206 to pass through the actuator 212 and position the control valve 214 accordingly.

Determining whether the first positioner 204 is operating properly may be facilitated by monitoring one or more operating characteristics of the first positioner 204. The monitored operating characteristics may include, for example, failure modes of the positioner, such as: electrical failure, travel feedback mechanism failure, I/P failure, pneumatic relay failure, and the like.

In the control system 200 shown in FIG. 2, the sensor 220 is a switch-loop integral with, and/or coupled to, the switch 218. The sensor 220 is responsive to one or more of the operating characteristics of the first positioner 204, wherein a detected failure mode(s) associated with the first positioner 204 may result in the switch 218 being positioned to allow the output signal from the second positioner 206 to pass through to the actuator 212. In an alternative configuration, the operating characteristic(s) sensed by the sensor 220 may be sent to the controller 216 and compared by the processor (not shown) to a threshold value of a respective operating characteristic. The controller 216 may or may not then send a control signal to the switch 218 to maintain or change the switch's position dependent upon the controller's determination of the first positioner's operability.

Another embodiment of the present invention directed to increasing the availability of a control valve assembly used in a control system is shown in FIG. 3. The control system 300 in FIG. 3 is very similar to the control system depicted in FIG. 2, except that the control signal sent to both positioners 304, 306 is transmitted from the same output port of the controller 316. In FIG. 3, a pair of positioners 304, 306 are arranged in a high-availability configuration and individually coupled to the controller 316 and a processor (not shown). Each positioner 304, 306 includes an input coupled to a signal source (308, 310; respectively) for controlling a valve 314. Depending upon the type of controller, the signal source 304, 306 utilized by the control valve assembly 302 may be pneumatic, hydraulic, or electrical based. In this example embodiment, the signal source for controlling the control valve 314 is pneumatic-based and the input of each positioner 304, 306 is coupled to a separate source of air-pressure.

Control signals sent from the controller 316 for controlling the valve 314 are received at each positioner 304, 306 and separately transformed as a respective output signal capable of cooperating with an actuator 312 for positioning the valve 314. Each positioner 304, 306 includes an output coupled to a separate input of a switch 318. The switch 318 may be a multi-positioned (e.g., three) solenoid switch and an output of the switch 318 is coupled to an input of the actuator 312 that is coupled to the controller 314.

The pair of positioners 304, 306 and the switch 318 are configured in a manner where one of the positioners is implemented as the primary positioner and primarily used by the controller 316 to position the valve 314. The other positioner is implemented as the secondary positioner and supports or backs up the primary positioner, wherein the secondary positioner will be used to position the valve 314 should the primary positioner 304 be regarded as inoperable to some extent.

More particularly, the control system 300 monitors the operation of the first positioner 304, wherein the switch 318, in cooperation with a sensor 320, is adapted and configured to enable one of the outputs of the positioners 304, 306 to pass through to the actuator 312 depending on the operability of the first positioner 304. In general, if the first positioner 304 is operating properly, the switch 318 is positioned to permit the output signal received from the first positioner 304 to pass through to the actuator 312 and position the control valve 314 accordingly. On the other hand, if the first positioner 304 is not operating properly to some extent, the switch is positioned to permit the output signal received from the second positioner 306 to pass through the actuator 312 and position the control valve 314 accordingly.

Determining whether the first positioner 304 is operating properly may be facilitated by monitoring one or more operating characteristics of the first positioner 304. The monitored operating characteristics may include, for example, failure modes of the positioner, such as: electrical failure, travel feedback mechanism failure, I/P failure, pneumatic relay failure, and the like.

In the control system 300 shown in FIG. 3, the sensor 320 may be a switch-loop integral with, and/or coupled to, the switch 318. The sensor 320 is responsive to one or more of the operating characteristics of the first positioner 304, wherein a detected failure mode(s) associated with the first positioner 304 may result in the switch 318 being positioned to allow the output signal from the second positioner 306 to pass through to the actuator 312. In an alternative configuration, the operating characteristic(s) sensed by the sensor 320 may be sent to the controller 316 and compared by the processor (not shown) to a threshold value of a respective operating characteristic. The controller 316 may or may not then send a control signal to the switch 318 to maintain or change the switch's position dependent upon the controller's determination of the first positioner's operability.

Figure 4:
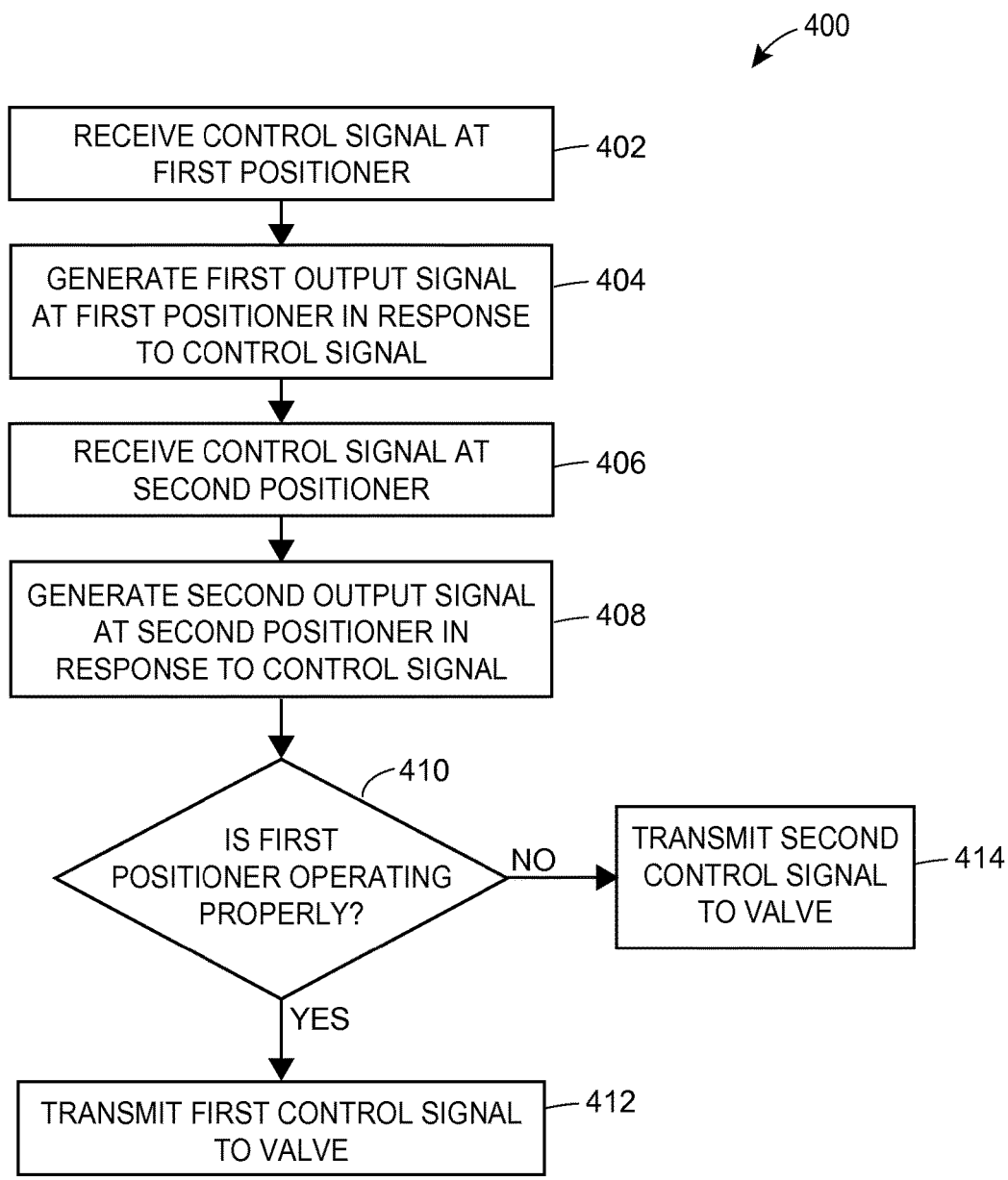
FIG. 4 is a flow diagram of an example method for controlling valve in accordance with the principles of the present disclosure.

A flow diagram 400 of an example method for controlling a control valve capable of being implemented in a process system depicted in FIG. 1, 2, or 3 is shown in FIG. 4. The method may be integrated into the module stored in the memory and is capable of being executed on the processor of the controller. A control signal for controlling the valve is transmitted from the controller to the first positioner (block 402). The first positioner receives the control signal and generates an associated output signal to the switch (block 404). For example, the first positioner may receive an electrical current signal and transform the electrical current signal into a representative air-pressure signal for cooperation with a pneumatically controlled device, such as an actuator. The control signal for controlling the valve is also received at the second positioner (block 406). The second positioner receives the control signal and generates an associated output signal to the switch (block 408). For example, similar to the first positioner, the second positioner may receive an electrical current signal and transform the electrical current signal into a representative air-pressure signal for cooperation with a pneumatically controlled device, such as an actuator. A determination is made regarding the operability of the first positioner (block 410). If the first positioner is operating properly, the switch passes the output signal received from the first positioner to the actuator for positioning the valve accordingly (block 412). On the other hand, if the first positioner is detected as not operating properly, the switch passes the output signal received form the second positioner to the actuator for positioning the valve accordingly (block 414).

The determination of the first positioner's operability may involve a sensor coupled to the controller, wherein the controller may analyze the information received from the senor with respect to acceptable operating characteristics and determine whether the first positioner is operating properly. The controller may then send a corresponding signal to the switch, wherein the switch will respond accordingly and allow the output signal from the first positioner or the second positioner to pass through to the control valve. Alternatively, the sensor may include a switch-loop capable of receiving information from the first positioner and determining whether the first positioner is operating properly. For example, the switch-loop sensor may include a relay switch and be configured to receive failure-mode information associated with the first positioner. Based on the received failure mode information, the relay may automatically initiate a position change of the switch that will permit the output signal from either the first positioner or the second positioner to pass through to the control valve.

It is apparent from the description above that the availability of a control valve assembly may be effectively extended by a control valve assembly incorporating a pair of positioners configured as described herein.

Although certain example methods, apparatuses, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of particular operations may be distributed among the one or more processors, not only residing within a single machine, but deployed across a number of machines. In some example embodiments, the processor or processors may be located in a single location (e.g., within a home environment, an office environment, a mobile platform, or as a server farm), while in other embodiments the processors may be distributed across a number of locations.

The performance of particular operations may be distributed among the one or more processors, not only residing within a single machine, but deployed across a number of machines. In some example embodiments, the one or more processors or processor-implemented modules may be located in a single geographic location (e.g., within a home environment, an office environment, a mobile platform, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "identifying," "predicting," "analyzing," and the like may refer to actions or processes of a machine (e.g., a computing device) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Still further, for the purposes of illustration only, the figures depict preferred embodiments of a communication system and method for a mobile platform. One skilled in the art will readily recognize from the discussion above that alternative embodiments of the structures and methods illustrated herein may be employed without departing from the principles described herein.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A system for controlling a field device in a control process, the system comprising a first positioner including an operating state and configured to receive a first control signal at a first input of the first positioner, the first positioner providing a first output signal at a first output of the first positioner in response to the first control signal; a second positioner configured to receive a second control signal at a first input of the second positioner, the second positioner providing a second output signal at a first output of the second positioner in response to the second control signal; a switch including a first input coupled to the first output of the first positioner and receiving the first output signal, a second input coupled to the first output of the second positioner and receiving the second output signal, and a third input responsive to the operating state of the first positioner, the switch further including an output coupled to the field device, wherein the switch permits the first output signal of the first positioner to pass to the field device when the operating state of the first positioner is operable and the switch permits the second output signal of the second positioner to pass to the field device when the operating state of the first positioner is inoperable.

Aspect 2: The system of aspect 1, wherein the field device is a valve.

Aspect 3: The system any one of aspects 1-2, further comprising: a controller coupled to the first positioner and the second positioner, wherein the first control signal and the second control signal are transmitted from a controller output of the controller.

Aspect 4: The system of any one of aspects 1-3, further comprising a controller coupled to the first positioner and the second positioner, wherein the first control signal is transmitted from a first controller output of the controller and the second control signal is transmitted from a second controller output of the controller.

Aspect 5: The system of any one of aspects 1-4, further comprising a sensor coupled to the switch and monitoring the operating state of the first positioner.

Aspect 6: The system of aspect 5, wherein the sensor is a switch-loop including a relay.

Aspect 7: A method of controlling a field device in a control process, the method comprising receiving a control signal at a first positioner and a second positioner; generating a first output signal from the first positioner in response to the control signal; generating a second output signal from the second positioner in response to the control signal; monitoring operation of the first positioner; determining whether the first positioner is operational; automatically enabling the first output signal to reach the field device if the first positioner is operational; and automatically enabling the second output signal to reach the field device if the first positioner is not operational.

Aspect 8: A method of controlling a field device in a control process, the method comprising monitoring an operating state of the field device; receiving a first control signal at a first positioner; receiving a second control signal at a second positioner; generating a first output signal from the first positioner in response to the first control signal; generating a second output signal from the second positioner in response to the second control signal; enabling the first output signal to reach the field device; monitoring an operating state of the first positioner; detecting a failure associated with the operating state of the first positioner; automatically disabling the first output signal to reach the field device and enabling the second output signal to reach the field device.

Aspect 9: A tangible, computer-readable medium storing instructions that when executed by one or more processors of a computer system cause the computer system to: receive a control signal at a first positioner and a second positioner; generate a first output signal from the first positioner in response to the control signal; generate a second output signal from the second positioner in response to the control signal; monitor operation of the first positioner; determine whether the first positioner is operational; and automatically enable the first output signal to reach the field device if the first positioner is operational; and automatically enable the second output signal to reach the field device if the first positioner is not operational.

Aspect 10: A tangible, computer-readable medium storing instructions that when executed by one or more processors of a computer system cause the computer system to: monitor an operating state of the field device; receive a first control signal at a first positioner; receive a second control signal at a second positioner; generate a first output signal from the first positioner in response to the first control signal; generate a second output signal from the second positioner in response to the second control signal; enable the first output signal to reach the field device; monitor an operating state of the first positioner; detect a failure associated with the operating state of the first positioner; and automatically disable the first output signal to reach the field device and enable the second output signal to reach the field device.

What is claimed is:

1. A system for controlling a field device in a control process, the system comprising:
   a first positioner including an operating state and configured to receive a first control signal at a first input of the first positioner, the first positioner providing a first fluid output in response to the first control signal;
   a second positioner configured to receive a second control signal at a first input of the second positioner, the second positioner providing a second fluid output in response to the second control signal;
   a switch including a first fluid input coupled to the first positioner and receiving the first fluid output, a second fluid input coupled to the second positioner and receiving the second fluid output, and a third input responsive to the operating state of the first positioner, the switch further including a fluid output coupled to the field device, wherein when the operating state of the first positioner is operable, the switch enables the first fluid output of the first positioner to flow to the field device and prevents the second fluid output of the second positioner to flow to the field device, and when the operating state of the first positioner is inoperable, the switch enables the second fluid output of the second positioner to flow to the field device and prevents the first fluid output of the first positioner to flow to the field device.

2. The system of claim 1, wherein the field device is a valve.

3. The system of claim 1, further comprising:
a controller coupled to the first positioner and the second positioner, wherein the first control signal and the second control signal are transmitted from a controller output of the controller.

4. The system of claim 1, further comprising:
a controller coupled to the first positioner and the second positioner, wherein the first control signal is transmitted from a first controller output of the controller and the second control signal is transmitted from a second controller output of the controller.

5. The system of claim 1, further comprising:
a sensor coupled to the switch and monitoring the operating state of the first positioner.

6. The system of claim 5, wherein the sensor is a switch-loop including a relay.

7. The system of claim 1, wherein the switch is a solenoid.

8. The system of claim 1, wherein the first fluid output is a liquid and the second fluid output is a liquid.

9. The system of claim 1, wherein the first fluid output is a gas and the second fluid output is a gas.

10. A method of controlling a field device in a control process, the method comprising:
receiving a control signal at a first positioner and a second positioner;
generating a first fluid output from the first positioner in response to the control signal;
generating a second fluid output from the second positioner in response to the control signal;
monitoring operation of the first positioner;
determining whether the first positioner is operational; wherein
when the first positioner is operational, automatically enabling the first fluid output to reach the field device and preventing the second fluid output to reach the field device; and
when the first positioner is not operational, automatically enabling the second fluid output to reach the field device and preventing the first fluid output to reach the field device.

11. A method of controlling a field device in a control process, the method comprising:
monitoring an operating state of the field device;
receiving a first control signal at a first positioner;
receiving a second control signal at a second positioner;
generating a first fluid output from the first positioner in response to the first control signal;
generating a second fluid output from the second positioner in response to the second control signal;
enabling the first fluid output to reach the field device;
monitoring an operating state of the first positioner;
detecting a failure associated with the operating state of the first positioner; and
automatically preventing the first fluid output to reach the field device and enabling the second fluid output to reach the field device.

12. A non-transitory and tangible computer-readable medium storing instructions that when executed by one or more processors of a computer system cause the computer system to:
receive a control signal at a first positioner and a second positioner;
generate a first fluid output from the first positioner in response to the control signal;
generate a second fluid output from the second positioner in response to the control signal;
monitor operation of the first positioner;
determine whether the first positioner is operational; wherein
when the first positioner is operational, automatically enable the first fluid output to reach the field device and prevent the second fluid output to reach the field device; and
when the first positioner is not operational, automatically enable the second fluid output to reach the field device and prevent the first fluid output to reach the field device.

13. A non-transitory and tangible computer-readable medium storing instructions that when executed by one or more processors of a computer system cause the computer system to:
monitor an operating state of the field device;
receive a first control signal at a first positioner;
receive a second control signal at a second positioner;
generate a first fluid output from the first positioner in response to the first control signal;
generate a second fluid output from the second positioner in response to the second control signal;
enable the first fluid output to reach the field device;
monitor an operating state of the first positioner;
detect a failure associated with the operating state of the first positioner; and
automatically prevent the first fluid output to reach the field device and enable the second fluid output to reach the field device.

* * * * *